United States Patent
Fenske et al.

(10) Patent No.: US 11,865,611 B2
(45) Date of Patent: Jan. 9, 2024

(54) PRODUCTION METHOD FOR A COMPONENT HAVING INTEGRATED CHANNELS AND COMPONENT

(71) Applicant: Siemens Energy Global GmbH & Co. KG, Bayern (DE)

(72) Inventors: Sören Fenske, Berlin (DE); Thorsten Mattheis, Mülheim (DE); Martin Schäfer, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 243 days.

(21) Appl. No.: 17/420,730

(22) PCT Filed: Jan. 22, 2020

(86) PCT No.: PCT/EP2020/051475
§ 371 (c)(1),
(2) Date: Jul. 6, 2021

(87) PCT Pub. No.: WO2020/156898
PCT Pub. Date: Aug. 6, 2020

(65) Prior Publication Data
US 2022/0105562 A1    Apr. 7, 2022

(30) Foreign Application Priority Data

Jan. 29, 2019   (DE) .................. 10 2019 201 085.7

(51) Int. Cl.
*B22D 25/02* (2006.01)
*B33Y 80/00* (2015.01)
(Continued)

(52) U.S. Cl.
CPC ........... *B22D 25/02* (2013.01); *B22D 39/023* (2013.01); *B22F 5/04* (2013.01); *B22F 7/08* (2013.01);
(Continued)

(58) Field of Classification Search
CPC ...... B22D 25/02; B22D 39/023; B33Y 80/00; B33Y 10/00; F01D 5/18; F01D 5/3007;
(Continued)

(56) References Cited

U.S. PATENT DOCUMENTS 9,962,799 B2 * 5/2018 Hascoet ............. B23K 26/0884
2002/0159888 A1 * 10/2002 Rinck ...................... F01D 5/20
29/889.721
(Continued)

FOREIGN PATENT DOCUMENTS

CN   107002495 A   8/2017
CN   107127301 A   9/2017
(Continued)

OTHER PUBLICATIONS

PCT International Search Report and Written Opinion of International Searching Authority dated Mar. 12, 2020 corresponding to PCT International Application No. PCT/EP2020/051475 filed Jan. 22, 2020.

*Primary Examiner* — Phutthiwat Wongwian
*Assistant Examiner* — Susan E Scharpf
(74) *Attorney, Agent, or Firm* — Wolter Van Dyke Davis, PLLC

(57) ABSTRACT

A production method for a component having integrated channels for internal fluid guidance, having a first region, which is connected to a second region, and wherein the channels extend both through the first region and through the second region. The geometry of the component is modified to the technological characteristics of both production methods. The first region is produced by a method for casting using lost models without undercuts, and proceeding from the first region, the second region is built up using an additive manufacturing method.

7 Claims, 2 Drawing Sheets

(51) Int. Cl.
  *F01D 5/18* (2006.01)
  *F01D 5/30* (2006.01)
  *B22F 5/04* (2006.01)
  *B22F 7/08* (2006.01)
  *B22F 10/00* (2021.01)
  *B22D 39/02* (2006.01)
  *B33Y 10/00* (2015.01)
  *B22F 10/28* (2021.01)

(52) U.S. Cl.
  CPC .............. *B22F 10/00* (2021.01); *B33Y 80/00* (2014.12); *F01D 5/18* (2013.01); *F01D 5/3007* (2013.01); *B22F 10/28* (2021.01); *B33Y 10/00* (2014.12); *F05D 2230/211* (2013.01); *F05D 2260/20* (2013.01); *Y02P 10/25* (2015.11)

(58) Field of Classification Search
  CPC .. B22F 10/28; B22F 7/08; B22F 10/00; B22F 5/04; F05D 2230/211; F05D 2260/20; Y02P 10/25
  See application file for complete search history.

(56) References Cited

U.S. PATENT DOCUMENTS

| | | | | |
|---|---|---|---|---|
| 2003/0062145 | A1* | 4/2003 | Frasier | G03F 7/0037 164/133 |
| 2006/0162893 | A1* | 7/2006 | Beck | B22C 7/02 164/28 |
| 2007/0003416 | A1* | 1/2007 | Bewlay | B23K 26/34 427/140 |
| 2008/0202718 | A1* | 8/2008 | Paul | B22C 7/02 164/521 |
| 2011/0052412 | A1* | 3/2011 | Ader | B22F 5/009 416/97 R |
| 2011/0143162 | A1* | 6/2011 | Merrill | B23P 15/04 216/48 |
| 2014/0127005 | A1* | 5/2014 | Schreiber | B32B 38/0032 415/177 |
| 2014/0178206 | A1* | 6/2014 | Gohler | F01D 5/005 29/889.7 |
| 2015/0000108 | A1* | 1/2015 | Hascoet | B23Q 39/024 29/527.2 |
| 2016/0265362 | A1* | 9/2016 | Slavens | B22F 3/24 |
| 2017/0043391 | A1* | 2/2017 | Fargeas | B22D 29/00 |
| 2017/0246678 | A1* | 8/2017 | Bunker | B22C 9/10 |
| 2017/0246688 | A1* | 8/2017 | Bunker | B22F 5/10 |
| 2017/0259329 | A1* | 9/2017 | Felwor | F01D 5/147 |
| 2017/0284206 | A1 | 10/2017 | Roberts et al. | |
| 2018/0161872 | A1* | 6/2018 | Brunhuber | B22F 7/06 |
| 2018/0209283 | A1 | 7/2018 | Kottilingam et al. | |
| 2019/0368377 | A1* | 12/2019 | VanTassel | F01D 11/10 |
| 2022/0341331 | A1* | 10/2022 | Heitmann | F28F 13/02 |

FOREIGN PATENT DOCUMENTS

| | | |
|---|---|---|
| CN | 107448241 A | 12/2017 |
| CN | 108698128 A | 10/2018 |
| DE | 102014009735 A1 | 1/2016 |
| DE | 102014012480 A1 | 3/2016 |
| DE | 102014012480 B4 | 6/2016 |
| EP | 3238863 A1 | 11/2017 |
| EP | 3508690 A1 | 7/2019 |
| WO | 2004004955 A1 | 1/2004 |
| WO | 2017189208 A1 | 11/2017 |

\* cited by examiner

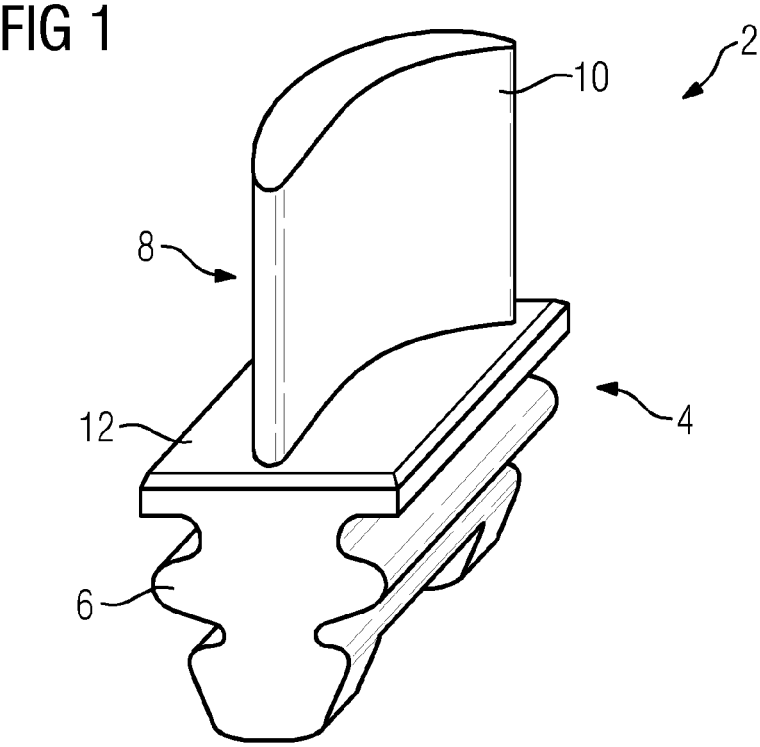
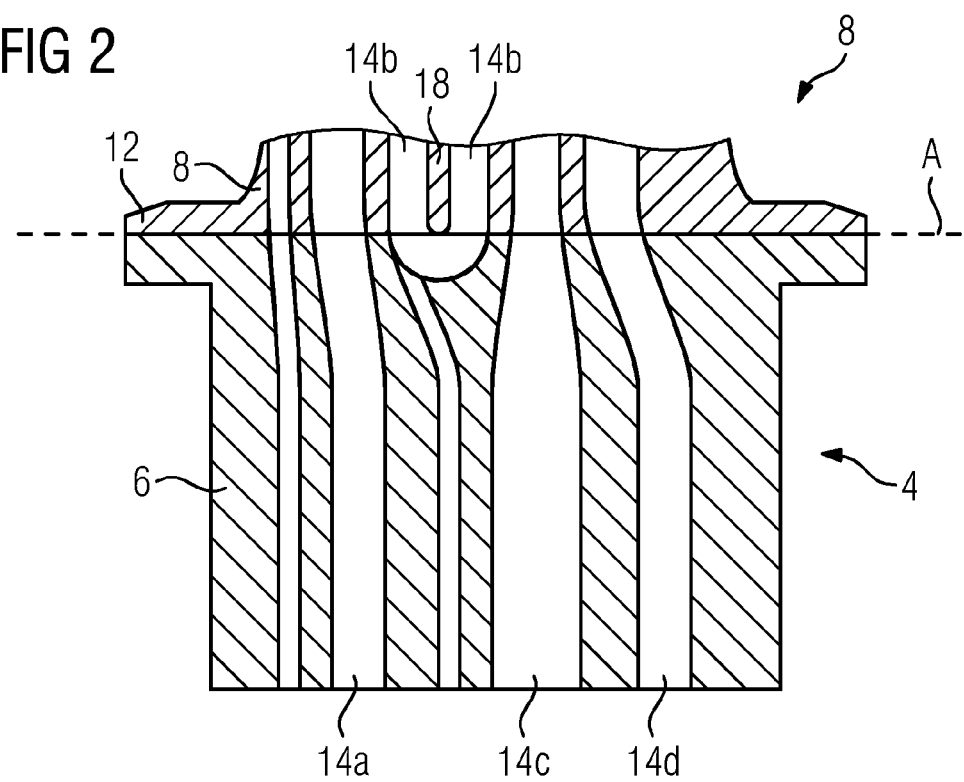

PRODUCTION METHOD FOR A COMPONENT HAVING INTEGRATED CHANNELS AND COMPONENT

CROSS REFERENCE TO RELATED APPLICATIONS

This application is the US National Stage of International Application No. PCT/EP2020/051475 filed 22 Jan. 2020, and claims the benefit thereof. The International Application claims the benefit of German Application No. DE 10 2019 201 085.7 filed 29 Jan. 2019. All of the applications are incorporated by reference herein in their entirety.

FIELD OF INVENTION

The invention relates to a production method for a component having integrated channels for internal guidance of fluid, comprising a first region which is connected to a second region and wherein the channels run through both the first region and the second region. The invention furthermore relates to a component having integrated channels for internal guidance of fluid, comprising a first region which is connected to a second region and wherein the channels run through both the first region and the second region.

BACKGROUND OF INVENTION

On the occasion of novel process properties, additive manufacturing processes afford economical and technical advantages over conventional, established manufacturing techniques. This qualifies them as a key technology for future industrial production systems. Despite existing potentials, such as the enormous freedom of geometry, they are subject to low productivity and inadequate product benefits. There are currently only limited options for combining additive manufacturing processes with established manufacturing techniques.

To date, the conventional and additive manufacturing processes have been merged without any special adaptation, that is to say the characteristic process features have not yet been taken into account. This is the case, for example, in DE 10 2014 012 480 B2. Said document describes a method for producing an impeller of a turbomachine, the impeller having a blade carrier and at least one blade. The production method is carried out using a generative manufacturing device. First of all, the blade carrier is provided and placed in a manufacturing space of the generative manufacturing device. A 3D volume data set that describes the at least one blade is loaded into the generative manufacturing device. A starting material for the blade is provided and, starting from the blade carrier, material cohesion of the starting material is produced in layerwise fashion by means of the generative manufacturing device. Here, a first layer is connected to the blade carrier in a materially bonded manner.

SUMMARY OF INVENTION

Proceeding from this prior art, the invention is based on the object of using a conventional manufacturing process and a generative manufacturing process to produce a component having integrated channels, the geometry of which is optimally adapted to the technological characteristics of the two manufacturing processes.

The object is achieved according to the invention by a production method for a component having integrated channels for internal guidance of fluid, comprising a first region which is connected to a second region and wherein the channels run through both the first region and the second region, wherein: —the first region is produced without undercuts by means of a process for casting with lost models, —starting from the first region, the second region is built up using a generative manufacturing process, and —at least one aperture which is open toward the second region is formed in the first region, said aperture forming the deflection region of a channel, running through the second region, with a change in flow direction.

The object is furthermore achieved according to the invention by a component having integrated channels for internal guidance of fluid, comprising a first region which is connected to a second region and wherein the channels run through both the first region and the second region, wherein the first region is a cast part which is produced by means of a process for casting with lost models and the first region is free of undercuts, and wherein the second region is applied using a generative manufacturing process starting from the first region, and the first region has at least one aperture which is open toward the second region and which forms the deflection region of a channel, running through the second region, with a change in flow direction.

The advantages and refinements listed below in relation to the production method can be transferred to the component in a corresponding manner.

"Additive manufacturing process" is understood to mean a process in which a component is built up in layers on the basis of digital 3D design data by way of the deposition of material. Additive manufacturing processes that can be used for this purpose are, for example, powder bed-based processes (powder bed fusion, e.g. selective laser melting, selective laser sintering and electron beam melting), direct energy deposition (DED, e.g. laser metal deposition), binder jetting or sheet lamination.

Models are used for the production of casting molds. A distinction is made between whether the models can be used once (lost model) or multiple times (permanent model). "Process for casting with lost models" here refers to a casting process in which the model can only be used once and is then destroyed. Such casting processes are, for example, precision casting, full-mold casting or lost-foam casting.

The invention is based on the idea of completely relocating the complex channel structures into the second region, which is produced by means of the additive manufacturing process. In this way, the first region, which is cast, can have a geometry that is simplified in such a way that the cast part (and also the model used once for casting) is free of undercuts. This allows a significant simplification of the production process for the first region. In this case, the first region is produced free of ceramic cores, which are necessary in order to be able to manufacture cast parts with cavities and which are removed or destroyed after solidification.

By virtue of the fact that the additive manufacturing process offers greater flexibility in the design and shaping of the components produced thereby, this flexibility is optimally used to print the second region, which has more complex channel geometries, onto the first region. Here, the two regions are connected to one another in a materially bonded manner in that the second region is built up in layers, starting from a surface of the first region. In this case, the geometry defined by the first region is continuously continued in order to complete the component.

The open aperture makes it possible to configure a channel with a change in flow direction, which is at least partially located in the first region, without the use of ceramic cores for the production of undercuts. The channel extends substantially through the second region, but the change in flow direction takes place at least partially in the first region. The aperture represents a hollow on the surface of the first region, the size of which is adapted to the size and course of the channel in the second region. In this case, a partition, which implements the deflection of the fluid, extends in particular only in the printed, second region.

According to a refinement, a larger number of channels are formed in the second region than in the first region. For reasons of geometry simplification, small channels are combined in the first region in order to form a few larger channels. Nevertheless, in particular all of the channels in the first region are fluidically connected to one or more channels in the airfoil.

The first region is advantageously produced by means of precision casting. Precision casting is the production of cast parts according to the lost wax process. The castings are characterized by their level of detail, dimensional accuracy and surface quality. In this case, the model is produced from specially suitable waxes or similar thermoplastics or mixtures thereof, for example in an injection molding process. The models are initially injected in single-cavity or multicavity molds. These molds are generally composed of aluminum or steel. Depending on the total quantity, the shape of the casting and the type of model material, the appropriate injection mold is built. In order to also introduce undercuts in the contour, preformed water-soluble or ceramic cores are generally required for use in precision casting, for which an additional tool is then required. In the production method according to the invention, it is specifically the use of such ceramic cores and additional tools that is dispensed with.

The first region is advantageously produced in series. "In series" is understood in particular to mean that a plurality of identical cast parts, which always form the first region, are used for the manufacture of a plurality of components of the same type.

The second region is advantageously produced individually, that is to say a second region is individually printed on a specific cast part. In particular, it is in this case possible to produce a plurality of components that have the same first region, but differ from one another with regard to the geometry of the second region, for example in that the channels are designed differently.

According to a further embodiment variant, the first region is configured in the form of a blade root of a turbine blade and the second region is configured in the form of a blade airfoil of a turbine blade. The turbine blade can be both a rotor blade and a guide blade.

As an alternative to the turbine blade, the component can be a constituent part of a burner or of a nozzle.

The second region is advantageously configured in such a way that it comprises a part of the blade root. This means that the first region and the second region are not identical to the two functional components, namely blade root and blade airfoil, of a turbine blade, but rather the second region also comprises an adjoining part of the blade root beyond the blade airfoil. Undercuts and the ceramic cores required therefor are avoided merely by virtue of the fact that the printed second region extends beyond the blade airfoil into the blade root.

BRIEF DESCRIPTION OF THE DRAWINGS

One exemplary embodiment of the invention is explained in more detail with reference to a drawing, in which:

FIG. 1 shows a perspective view of a turbine blade comprising a blade root and a blade airfoil, FIG. 2 shows a partial longitudinal section through a turbine blade according to a first embodiment.

DETAILED DESCRIPTION OF INVENTION

Figure 3:
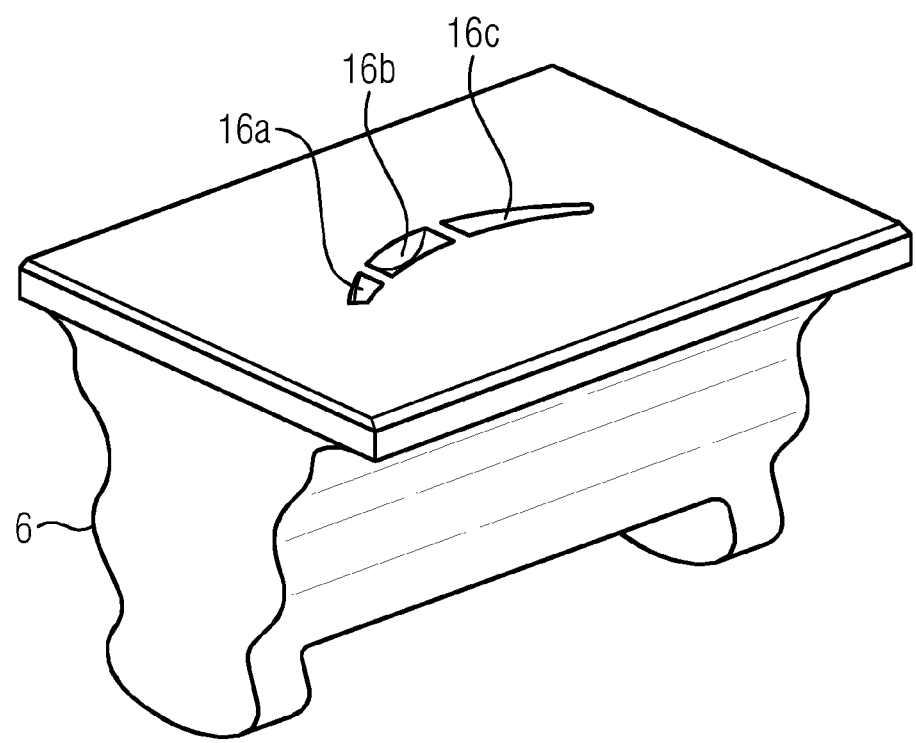
FIG. 3 shows a perspective view of the blade root of a turbine blade according to a second embodiment.

Identical reference designations have the same meaning in the various figures.

FIG. 1 shows a turbine blade 2, here a guide blade, which is of two-part construction.

A first region 4 of the turbine blade 2 is constructed as a cast part and substantially comprises a blade root 6 of the turbine blade 2. This first region 4 is produced in series by means of a process for casting with lost models, in particular by means of precision casting. In precision casting, a wax model in the form of the workpiece to be produced is made for each cast part. In this case, the production of the cast part 4 has been significantly simplified in that the blade root 6 does not have any undercuts. Thus, no ceramic cores are used in the production of the blade root 6.

A second region 8 of the turbine blade 2 is produced by means of a generative manufacturing process and comprises a blade airfoil 10 and a small part 12 of the blade root 6, said small part adjoining the blade airfoil 10. A first layer of the part 12 of the blade root 6 is connected to the cast part in a materially bonded manner and the rest of the second region 8 is built up in layers on it. In this case, there is particularly great flexibility in the design of the second region 8, said flexibility being able to be utilized to individually print a blade airfoil 10 on the standard cast part 4.

The boundary between the first region 4 and the second region 8 is shown in FIG. 2 by way of a dashed line A. The turbine blade 2 is cooled internally and, for cooling purposes, a plurality of channels or cooling channels 14a, 14b, 14c, 14d are formed in the turbine blade 2.

As can be seen from FIG. 3, the surface of the blade root 6 has cutouts 16a, 16b, 16c, wherein 16a and 16c form the openings of channels 14a, 14c which extend through both the first region 4 and the second region 8. Between the channels 14a, 14c, an aperture 16b is formed on the surface of the blade root 6, said aperture forming the deflection region of the channel 14b, running through the second region, with a change in flow direction. A partition 18 of the channel 14b, said partition enabling the change in flow direction, runs only through the second region 8, as shown in FIG. 2.

The blade root 6 according to FIG. 3 differs from that according to FIG. 2 in that the channel 14c has a relatively large cross section in the first region 4 and a plurality of channels (not shown here) are connected to the channel 14c in the second region, each channel having a small cross section. In this case, the cooling fluid flowing during operation of the turbine blade 2 is distributed, starting from the channel 14c, into the smaller channels in the blade airfoil 10. In comparison to FIG. 2, the channels 14c and 14d are combined to form a single channel 14c in the first region 4, but they run as separate channels in the second region 8.

The invention claimed is:

1. A production method for a component having integrated channels for internal guidance of fluid, the component comprising a first region which is connected to a second region and wherein the integrated channels run through both the first region and the second region, the method comprising:

producing the first region without undercuts by means of a process for casting with lost models, and, starting from the first region, building up the second region using a generative manufacturing process, and forming at least one aperture which is open toward the second region in the first region, said aperture forming a deflection region of a channel, running through the second region, with a change in flow direction.

2. The production method as claimed in claim 1,
wherein a greater number of channels are formed in the second region than in the first region.

3. The production method as claimed in claim 1,
wherein the first region is produced by means of precision casting.

4. The production method as claimed in claim 1,
wherein the first region is produced in series.

5. The production method as claimed in claim 1,
wherein the second region is manufactured individually.

6. The production method as claimed in claim 1,
wherein the first region is configured in the form of a blade root of a turbine blade and the second region is configured in the form of a blade airfoil of a turbine blade.

7. The production method as claimed in claim 6,
wherein the second region is configured in such a way that it comprises a part of the blade root.

\* \* \* \* \*